July 27, 1965  D. D. DONOHOO, JR  3,197,619

FUNCTION CONTROL APPARATUS

Filed Nov. 30, 1961  4 Sheets-Sheet 1

INVENTOR
DAVID D. DONOHOO, JR.
BY
Boris A. Kline
John J. Callahan
HIS ATTORNEYS

July 27, 1965  D. D. DONOHOO, JR  3,197,619
FUNCTION CONTROL APPARATUS
Filed Nov. 30, 1961  4 Sheets-Sheet 2

INVENTOR
DAVID D. DONOHOO, JR
BY
*Louis A. Kline*
*John J. Callahan*
HIS ATTORNEYS July 27, 1965 D. D. DONOHOO, JR 3,197,619
FUNCTION CONTROL APPARATUS
Filed Nov. 30, 1961 4 Sheets-Sheet 3
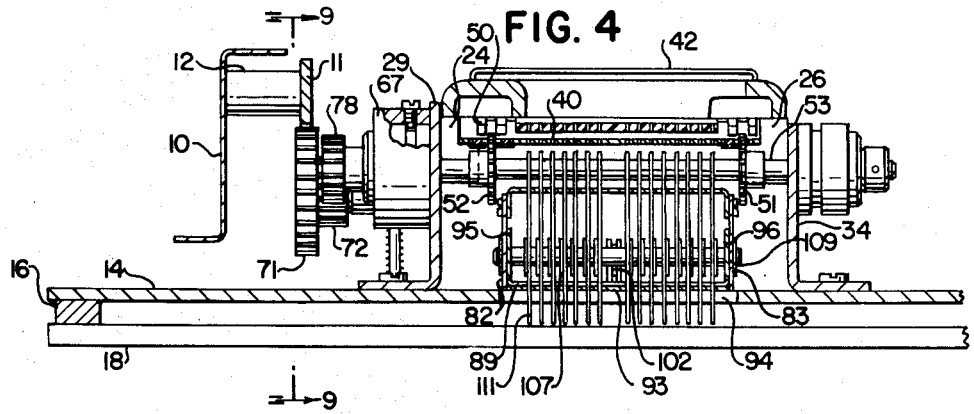
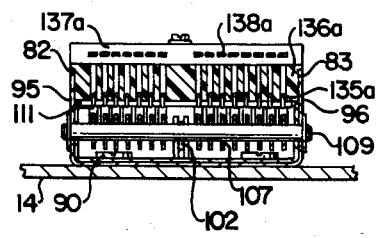
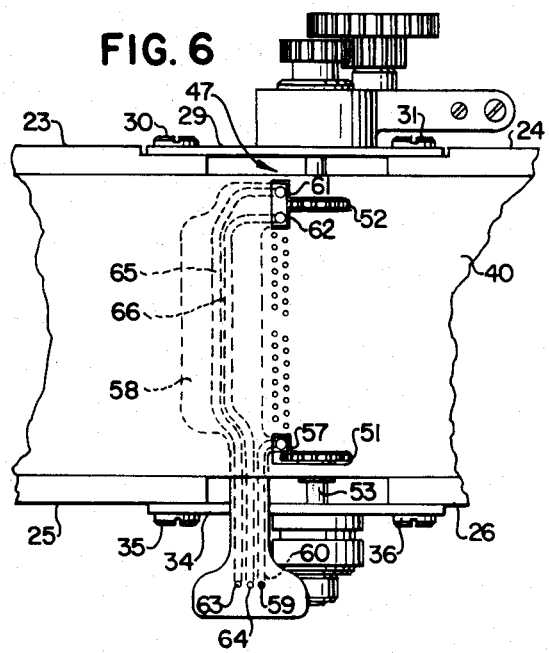
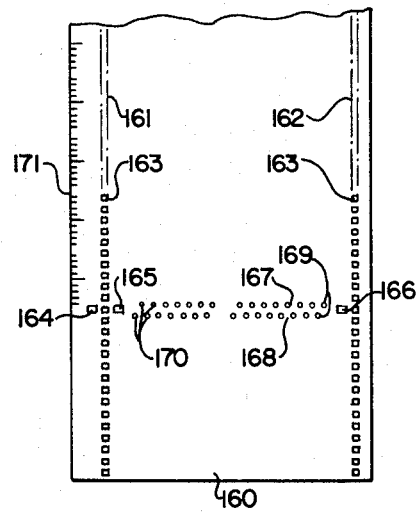
INVENTOR
DAVID D. DONOHOO, JR.
BY
HIS ATTORNEYS

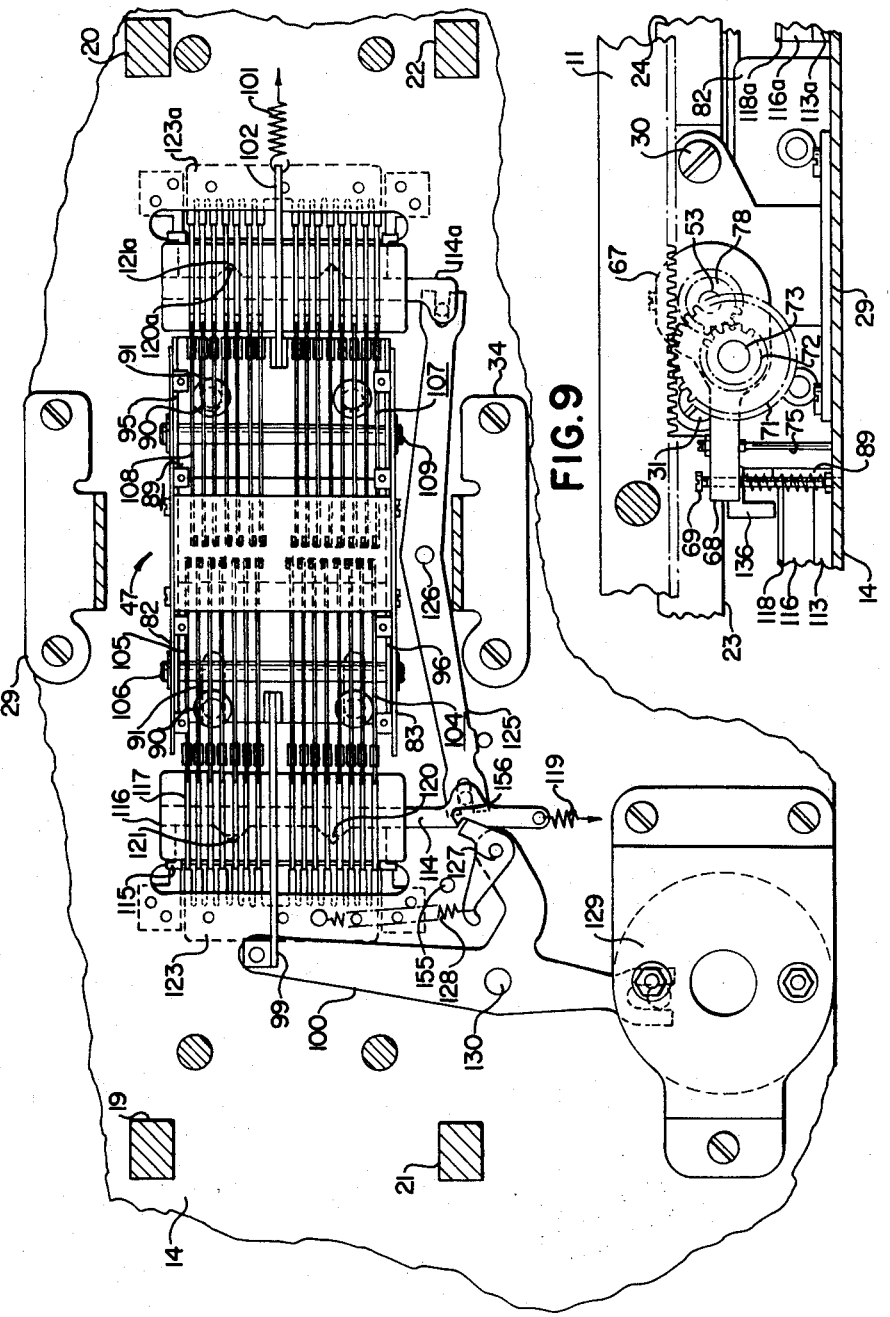

United States Patent Office 3,197,619
Patented July 27, 1965

3,197,619
FUNCTION CONTROL APPARATUS
David D. Donohoo, Jr., Centerville, Ohio, assignor to The National Cash Register Company, Dayton, Ohio, a corporation of Maryland
Filed Nov. 30, 1961, Ser. No. 156,073
15 Claims. (Cl. 235—61.11)

This invention relates to function or program control apparatus for automatic machines, and more particularly to a mechanical sensing device for sensing a medium, such as a perforated tape or record, for the occurrence of an indicium condition, such as the presence or lack of a perforation therein, and which is capable of retaining the sensed information until the next sense operation.

The present invention is particularly well adapted for use in the accounting machines disclosed in an application for Letters Patent of the United States, Serial Number 831,124, filed August 3, 1959, by Edward A. Thomas et al., now Patent No. 3,047,227.

The accounting machine disclosed in the Thomas et al. application is provided with a laterally-shiftable traveling carriage, which may be tabulated in either direction from one columnar position to another; or, if required, said carriage may be skip-tabulated through intervening columnar positions from one columnar position to a preselected columnar position.

The accounting machine disclosed in the Thomas et al. application includes a mechanical data entry and readout machine, to the rear of which are added an electromechanical device and an electronic multiplying device. The operation of the accounting machine is controlled by the traveling carriage in preselected columnar positions thereof, so as to permit the arranging of various programs adaptable to different business systems. A function control apparatus or carriage position switch mechanism is arranged at the back of the traveling carriage and is controlled or operated by adjustable stops or plates located on a rear form bar or stop bar at the rear of the traveling carriage. The function control apparatus is effective in preselected columnar positions of the traveling carriage to complete circuits for operating the multiplying device.

As disclosed in the Thomas et al. application, the adjustable stops are provided with holes to accommodate studs or pins which in turn cooperate with corresponding plungers of the function control apparatus. Each stop has, on its upper edge, a rearwardly-extending ear which serves to indicate to the accounting machine that an electrical operation (multiplication, recording, etc.) is desired to take place at the columnar position where a stop is located. Each stop also has, on its lower edge, another rearwardly extending ear, which serves to effect the transfer of a product from the product switches in the electromechanical device to the data entry and readout portion of the accounting machine. A stud, located in a hole in one position of a stop, controls the record operation when a recording device is associated with the accounting machine; a stud located in a hole in another position controls the multiply operation of the accounting machine; a stud located in a hole in a further position controls the entering or set-up of a multiplier factor in the multiplier switches of the accounting machine; and a stud located in a hole in a still further position controls the entering or set-up of a multiplicand factor in the multiplicand switches of the accounting machine. Other holes in still further positions of a stop are provided to accommodate studs in the event that other functions of the accounting machine are desired to be controlled. Accordingly, the functions of the accounting machine are automatically controlled by the carriage position mechanism at preselected columnar positions in accordance with a program determined by the stops and their associated studs.

It is an object of the present invention to provide, for an automatic machine, a function control or program selecting apparatus which is simpler and more economical in construction and operation, and more reliable in its functioning, then devices of the prior known art.

It is another object of the present invention to provide a function control aparatus which includes a novel device for sensing a medium for the occurrence of an indicium condition and which is capable of retaining the sensed information until the next sense operation.

It is still another object of the present invention to provide a sensing device for sensing a medium which is adapted to control the operation of machines of various types and functions.

It is a further object of the present invention to provide a sensing device having a sensing arm a portion of which is located in the first position if an indicium condition is sensed in an indicium-receiving area of a medium, while, if the lack of said indicium condition is sensed in that area, said portion of the sensing arm is located in a second position.

It is still a further object of the present invention to provide a sensing device having a sensing arm a portion of which is located in one of two possible positions dependent on whether an indicium condition or lack of an indicium condition is sensed in a medium, and having a means controlled by the sensing arm to electrically determine whether said portion is in one or the other of the two possible positions.

With these and other, incidental, objects in view, the invention includes certain novel features of construction and combinations of parts, a preferred form or embodiment of which is hereinafter described with reference to the drawings which accompany and form a part of this specification.

In one of its essential aspects, the present invention comprises a function control apparatus for an automatic machine, such as an accounting machine, which function control apparatus includes movable means on the machine, a function control medium on which function control data is recorded by indicia in any of a plurality of function control data-representing positions in a plurality of columns, a sensing station, means for moving the function control medium in synchronism with the movable means to cause at least a selected one of the columns of function control data-representing positions to be moved to the sensing station, first sensing means to sense at least one of the function control data-representing positions in the selected column for the occurrence of an indicium condition, second sensing means, and means controlled by the first sensing means upon sensing the occurrence of the indicium condition in the one function control data-representing position to cause the second sensing means to then sense other of the function control data-representing positions in the selected column for the occurrence of an indicium condition in each.

In another one of its essential aspects, the present invention comprises a device for sensing a medium, such as a perforated tape, for the occurrence of an indicium condition, such as the presence or lack of a perforation in an indicium-receiving area of the medium, and which is capable of retaining the sensed information until the next sense operation. The sensing device includes a sensing arm, a sensing member connected to the sensing arm, movable means for supporting the sensing arm with a portion of the sensing arm normally located in a first position, means to move the movable means, and means for biasing the portion of the sensing arm towards the first position, at least during movement of the movable means, whereby the sensing member is caused to move into association with an indicium-receiving area of the medium. If the sensing member senses the indicium condition in the indicium-receiving area, the biasing means maintains the portion of the sensing arm in the first position; and, if the sensing member senses the lack of the indicium condition on the indicium-receiving area, the portion of the sensing arm moves out of the first position to a second position, against the action of the biasing means. The sensing device also includes holding means operable after movement of the portion of the sensing arm out of the first position to hold the portion of the sensing arm in the second position, and means to electrically determine whether the portion of the sensing arm is in the first position.

The invention will be better understood from the following description, taken in conjunction with the accompanying drawings, in which:

FIG. 4 is a cross-section view of the function control apparatus, as observed in the direction indicated by the arrows 4—4 in FIG. 2;

FIG. 5 is a cross-section view of the function control apparatus, as observed in the direction indicated by the arrows 5—5 in FIG. 2, showing one set of sensing arms and sensing members;

FIG. 6 is a fragmentary top view of the function control apparatus, showing electrical circuit means utilized for sensing certain function control data appearing in a tape, which function control data is provided to indicate a carriage position of the accounting machine at which the mechanical sensing device is to become operative to sense for other function control data in a selected column of the tape;

FIG. 7 is a view of the plastic tape control medium, showing the arrangement of the perforations therein;

FIG. 8 is a top plan view of the function control apparatus, showing the resetting or restoring portion thereof; and FIG. 9 is a fragmentary view, as observed in the direction indicated by the arrows 9—9 in FIG. 4, showing the means utilized for movement of the control medium in response to movement of the carriage of the accounting machine.

While the present invention is adapted for operation in machines other than accounting machines of the type disclosed in the Thomas et al, application, heretofore referred to, it is particularly well adapted for use therewith, and therefore the following description is exemplary of such use.

Figure 1:
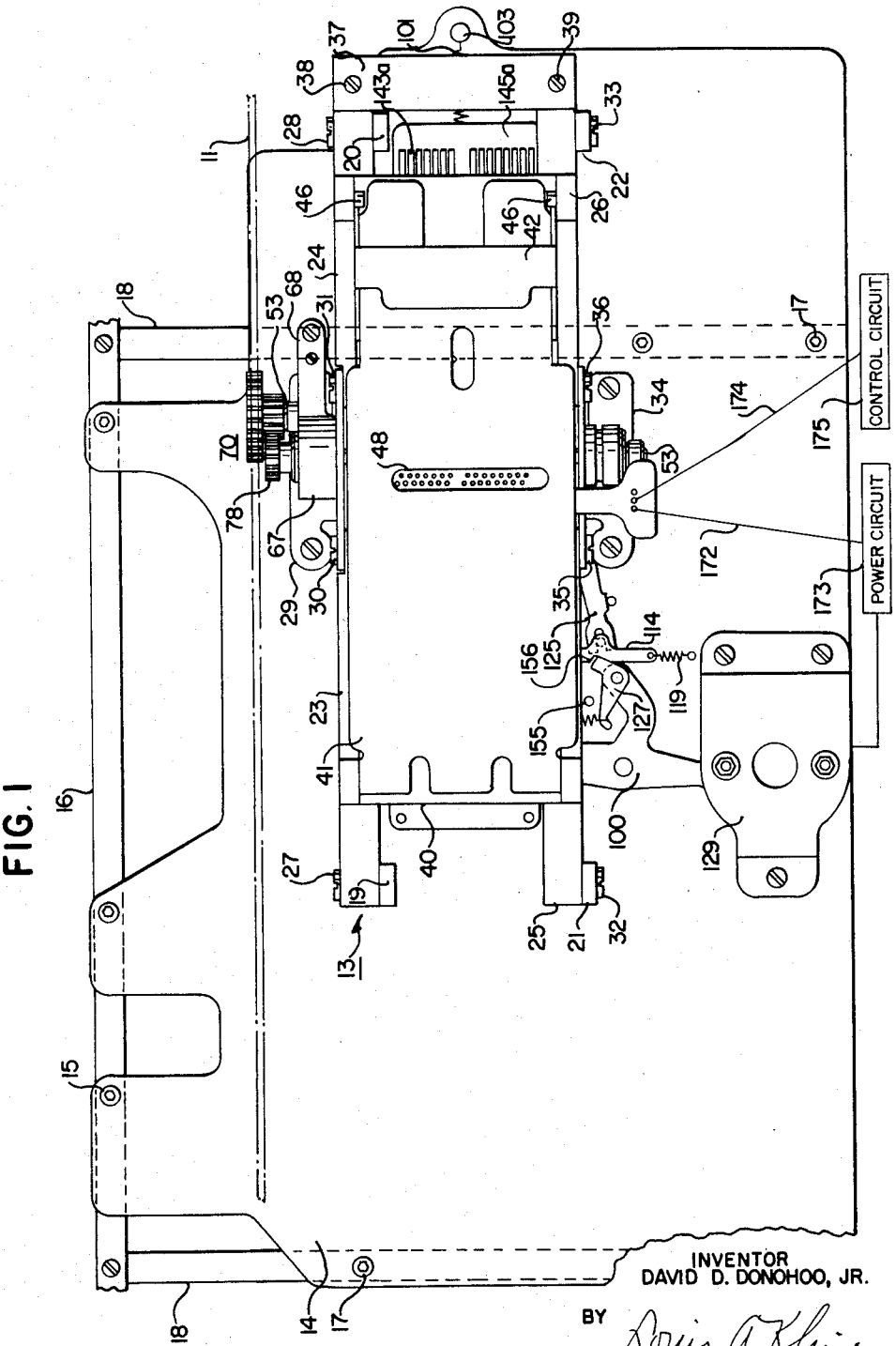
FIG. 1 is a top plan view of the function control apparatus, showing its manner of association with an accounting machine.

Referring now to the drawings, and particularly to FIGS. 1, 4, and 9, there is shown a fragmentary rear portion of an accounting machine of the type shown in the Thomas et al, application, which includes a laterally-shiftable traveling carriage comprising right and left frames and housings connected at the rear by a Z-shaped bracket 10 (FIG. 4). Secured to the lower portion of the bracket 10 is a longitudinal rack (not shown), having teeth which are driven by the fluid drive mechanism (not shown) of the accounting machine. An auxiliary rack 11 is attached by means of studs, such as the stud 12 (FIG. 4), to the bracket 10.

The medium reader 13 portion of the function control apparatus of this invention is mounted on a support plate 14, the forward portions of which are secured by screws 15 to a cross bar 16 of the accounting machine. The side portions of the support plate 14 are secured by screws 17 to a pair of side bars 18, which are fastened together at their forward ends by the cross bar 16.

The support plate 14 is provided with four columns, 19 to 22, which serve to support the top or tape table portion of the medium reader 13 above its bottom, or sensing member, portion. The top table portion of the medium reader 13 comprises a pair of front support bars 23 and 24 and a pair of rear support bars 25 and 26. The front support bars 23 and 24 are attached at one of their ends to the columns 19 and 20, respectively, by means of screws 27 and 28, while their other ends are attached to a front bracket 29 by means of screws 30 and 31. The rear support bars 25 and 26 are attached at one of their ends to the columns 21 and 22, respectively, by means of screws 32 and 33, while their other ends are attached to a rear bracket 34 by means of screws 35 and 36. A crosspiece 37 is attached at its ends to the front support bar 24 and the rear support bar 26 by means of screws 38 and 39. A plate 40 (FIGS. 2, 4 and 6) serves as a support for the control medium and is attached to the top portions of the bars 23 to 26. A lid or cover 41 is provided for the medium reader 13 to cover the plate 40 along with the control medium which it is adapted to support. The lid 41 is pivotally connected at one side to the front support bar 23 and to the rear support bar 25. A C-shaped latch 42 is provided at the other end of the lid 41 and is secured at its ends to the sides of the lid 41 by means of screws 43. The screws 43 extend through slots 44 in the ends of the latch 42, whereby the latch 42 may be moved to the right (FIG. 2), so as to allow projecting portions 45 thereof to lie underneath studs 46, extending inwardly from the front and rear support bars 24 and 26.

Attached to the underside portion of the lid 41 at a sensing station or location 47, and adjacent to a slot 48, provided in the lid 41, is a plastic guide block 49. The guide block 49 is provided with a plurality of vertical apertures to accommodate and guide sensing members should they extend through a perforation in the control medium. A metallic comb-shaped member 50 is also attached to the underside portion of the lid 41 and straddles sprocket wheels 51 and 52, which are secured to a rotatable shaft 53. Also attached to the underside of the lid 41 is an insulating block 54, holding a switch arm 55, having a contact point 56, which is adapted to extend through a perforation in the control medium and engage a contact point 57 (FIG. 6). The contact point 57 is mounted on a printed circuit board 58, which is secured to the underside of the tape support plate 40. The contact point 57 is coupled to a terminal 59 by means of a conductive pathway 60 formed on the printed circuit board 58. Another insulating block (not shown), similar to the insulating block 54, is provided on the underside of the lid 41 and carries two switch arms and contact points (not shown). One of these latter contact points is adapted to engage a contact point 61, while the other is adapted to engage a contact point 62 (FIG. 6). The contact points are coupled to terminals 63 and 64, respectively, by means of conductive pathways 65 and 66.

Attached to the bracket 29 is a collar 67 having an arm 68, which is secured to the support plate 14 by means of a screw 69. A compound gear 70, comprising the gears 71 and 72, is attached to the arm 68 by means of a shaft 73 (FIG. 9) and a spacer 74. An elongated screw 75 (FIG. 9) is adapted to engage the top surface of the support plate 14 to allow for adjustment of the level of the shaft 73. An annular retainer member 76 (FIG. 3) is encompassed by the collar 67 and holds a ball-bearing assembly 77. A gear 78 is attached to the forward end of the shaft 53 and is adapted to cooperate with the gear 71. Another retainer member 79 and ball-bearing assembly 80 is attached to the rear of the shaft 53 by means of a ring member 81.

Figure 2:
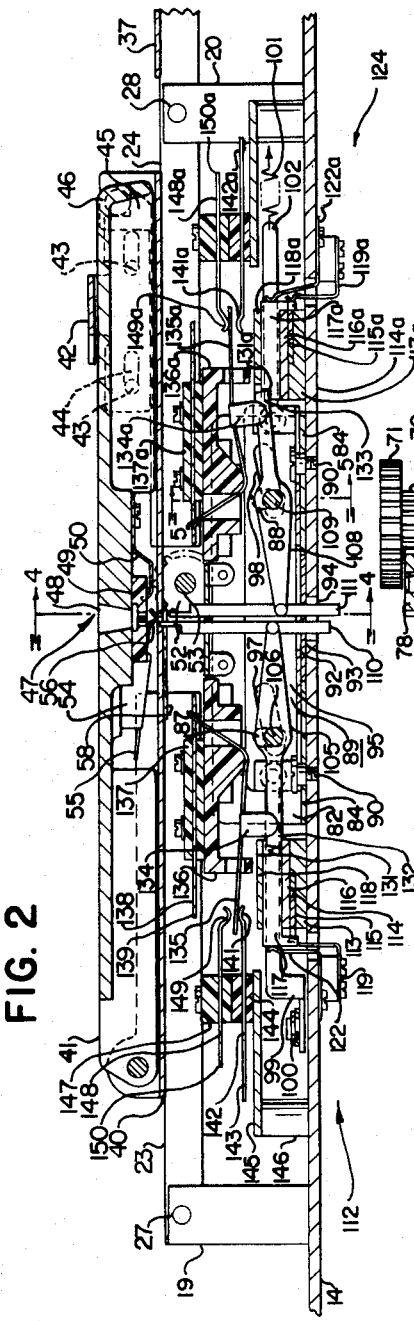
FIG. 2 is a side elevation of the function control apparatus, including its housing, sensing, storing, and resetting structure portions.
Figure 3:
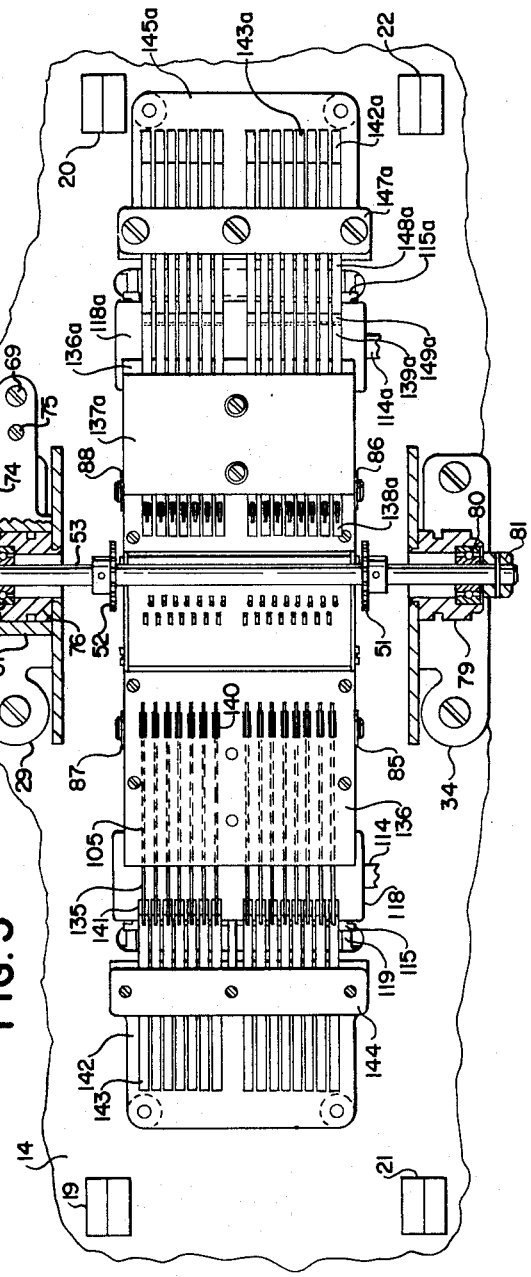
FIG. 3 is a partial top plan view of the function control apparatus with its cover or lid removed.

The bottom or sensing member portion of the medium reader 13 is provided with front and rear support plates 82 and 83, which form a pair of U-shaped members with the bottom portions 84. The portions 84 are attached to the support plate 14 by means of screws 90. The plate 82 is provided with apertures 85 and 86, which are in alignment with apertures 87 and 88 in the plate 83 (FIGS. 2 and 3).

A laterally-movable control slide 89 (FIGS. 2 and 4) is secured to the support plate 14 by the screws 90, which are accommodated in four slots 91 in the control slide (FIG. 9). The control slide 89 has in its center portion a rectangular opening 92 (FIG. 2), which accommodates an apertured plate 93, which is, in turn, secured to the support plate 14. The apertured plate 93 lies over a rectangular opening 94 in the support plate 14. The control slide 89 has upturned sides 95 and 96, which are located adjacent to the inner surfaces of the front and rear support plates 82 and 83. The upturned side 95 of the control slide 89 is provided with inclined apertures 97 and 98 (FIG. 2), and the upturned side 96 is provided with similar inclined apertures (not shown). A link 99 is connected at one end to the left side of the control slide 89 and is connected at its other end to an operating arm 100. The control slide 89 is biased to the right by means of a spring 101, one end of which is connected to another link 102, while its other end is connected to a stud 103 (FIG. 1). The stud 103 is in turn connected to the support plate 14. The link 102 is connected at one end to the spring 101 and at its other end to the control slide 89 (FIG. 8).

A first set 104 of sensing arms or levers 105 is rotatably supported by a shaft 106 to the left of the sensing station 47. The shaft 106 extends through the aperture 87 in the front support plate 82, through the aperture 97 in the upturned side 95 of the control slide 89, through the aperture (not shown) in the upturned side 96 of the control slide 89, and through the aperture 85 in the rear support plate 83.

A second set 107 of sensing arms or levers 108 is rotatably supported by a shaft 109 to the right of the sensing station 47. The shaft 109 extends through the aperture 88 in the front support plate 82, through the aperture 98 in the upturned side 95 of the control slide 89, through the aperture (not shown) in the upturned side 96 of the control slide 89, and through the aperture 86 in the rear support plate 83.

A sensing member or pin 110 is rotatably connected to one end of each of the sensing arms 105. Adjacent to the other end of the sensing arms 105 is located a reset and holding assembly 112 for the sensing arms 105, comprising a base plate 113 having a top surface portion which is removed to accommodate a reset link 114 and a reset plate 115, flush with the rest of its top surface, a guide block 116 secured to the base plate 113, a plurality of L-shaped reset slides 117 slidably mounted in slots in the top surface of the guide block 116, and a cover plate 118, having apertures located along one of its edges in alignment with the slots in the guide block 116.

The reset link 114 is biased to the rear by means of a spring 119, so that cam projections 120 (FIG. 8) along its edge are normally centrally located in cam apertures 121 in the reset plate 115. The reset plate 115 is biased to the right by means of a pair of springs, such as the spring 122 (FIG. 2), so that the cam apertures 121 engage the cam projections 120 of the reset link 114. Each of the reset slides 117 is biased to the right by means of a comb-shaped spring member 123 (FIG. 8) against the end 132 of the sensing arm 105.

A sensing member or pin 111 is also rotatably connected to one end of each of the sensing arms 108, and there is a reset and holding assembly 124, similar to the reset and holding assembly 112, for the sensing arms 108. The elements of the assembly 124 bear the small-letter subscript "a" to differentiate them from the elements of the assembly 112. A link 125, pivotally connected by means of a stud 126 to the support plate 14, interconnects the reset links 114 and 114a, so that, upon movement of the reset link 114 by the operating lever 127 (FIG. 8), the reset link 114a also is moved. The operating lever 127 is pivotally connected to the operating arm 100, with one of its ends connected to the support plate 14 by means of a spring 128, so as to bias its other end in engagement with the reset link 114.

A solenoid 129 is provided and, upon energization, rotates the operating arm 100 counter-clockwise about its pivot point at the stud 130. The stud 130 retains the operating arm 100 adjacent to the support plate 14. The counter-clockwise movement of the operating arm 100 causes the control slide 89 to be moved to the left and causes the operating lever 127 to move the reset link 114 forwardly. The forward movement of the reset link 114 causes the link 125 to rotate clockwise, which, in turn, causes the reset link 114a to move rearwardly.

Each of the reset slides 117 has a stepped surface 131, upon which one end 132 of an associated sensing arm 105 is adapted to rest when the lack of a perforation in the control medium is sensed by the sensing member 110. The end 132 of a sensing arm 105 lies adjacent the bottom surface of a slot in the guide block 116 when either a perforation is sensed in the control medium by the sensing member 110 or the sensing arm 105 has been returned to its reset condition prior to a next sensing operation. The sensing arm 105 (FIG. 2) is shown in its reset condition, while the end 133 of the sensing arm 107 is shown resting on the stepped surface 131a of the reset slide 117a. An insulating member 134 and 134a is attached to the sensing arms 105 and 108 near their ends 132 and 133.

Mounted above the sensing arms 105 are a plurality of contact elements 135, retained by a housing or frame 136 and a switch element 137, composed of insulating material, into which are molded copper alloy electric current conductors 138, having a terminal portion 139. Two of the contact elements 135 project through a hole 140 (FIG. 3) in each of the current conductors 138 and are prestressed by lateral movement of the switch element 137 to secure a reasonable contact force between the contact elements 135 and one end 141 of contact elements 142. The other end 143 of the contact elements 142 serves as a terminal to which an electrical circuit (not shown) is connected. The contact elements 142 are retained in a switch element 144, composed of insulating material. The switch element 144 is mounted on a support plate 145, which is held above the support plate 14 by means of spacers 146. Mounted on top of the switch element 144 is another switch element 147, composed of insulating material and carrying contact elements 148, having one of their ends 149 adapted to be engaged by a pair of the contact elements 135, while the other of their ends 150 serves as a terminal to which another electrical circuit (not shown) is connected.

The control medium utilized in conjunction with the sensing device in the illustrated embodiment comprises a plastic tape 160 (FIG. 7), provided with two columns 161 and 162 of sprocket holes 163. Between the left edge of the tape 160 and the column 161 of sprocket holes 163 is provided sufficient room to accommodate perforations, such as the perforations 164. The perforation 164 is punched to represent a columnar position of the traveling carriage of the accounting machine at which an electrical operation, such as multiplication or recording, is desired to occur. A perforation 165 is also punched in an area to the right of the column 161 of sprocket holes 163 to represent a columnar position of the traveling carriage at which a product is desired to be transferred from the multiplying device to the product switches in the accounting machine. Another perforation, such as the perforation 166, may be punched in an area to the left of the column 162 of sprocket holes 163 to obtain additional sensing of the position of the traveling carriage for other devices and for other purposes.

The tape 160 is also provided with lateral areas which may accommodate two rows 167 and 168 of perforations 169. The perforations in the row 167 are sensed by the sensing members 111, while the perforations in the row 168 are sensed by the sensing members 110. Four of the perforations 169, located to the right of the perforation 165 and indicated by the reference numeral 170, are provided in the tape 160 to control the following operations of the accounting machine. One of these perforations serves to initiate the record operation when a recorder is to be operated in conjunction with the accounting machine. Another perforation serves to initiate the multiply operation. Another perforation causes the multiplier factor to be entered into the multiplier switches in the accounting machine, and the last of these four perforations causes the multiplicand factor to be entered into the multiplicand switches in the accounting machine. The remaining perforations 169 are provided in the tape 160 in the event that other functions of the accounting machine are desired to be controlled. The tape 160 is provided with graduations along one edge thereof, which coincide with stopping locations of the traveling carriage of the accounting machine and furnish a programmer with locations for punching the perforations 164, 165, and 169. When the traveling carriage moves a certain distance, the tape 160 is moved one half that distance in synchronism therewith. Accordingly, the length of a tape-programming area is one half the carriage movement distance.

The operation of the function control apparatus will now be described. The lateral tabulating or return movement of the traveling carriage of the accounting machine is transmitted by the auxiliary rack 11 through the compound gear 70 and the gear 78, which is attached to the shaft 53, as rotary motion which is carried to the sprocket wheels 51 and 52. The teeth of the sprocket wheels 51 and 52 engage the sprocket holes 163 of the tape 160. The rotary motion of the teeth of the sprocket wheels 51 and 52 drives the tape 160 in an opposite lateral motion at one half the displacement of the traveling carriage, thus presenting various areas of the tape's surface or various columns of function control data-representing positions to the sensing station 47.

The tape 160 is inserted into the function control apparatus by matching one end thereof with a location mark (not shown) on the support plate 40 while the accounting machine carriage is at a predetermined columnar position. This procedure matches one of the teeth of each of the sprocket wheels 51 and 52 with the proper sprocket holes 163 of the tape 160. The lid 41 of the medium reader 13 is then closed and is secured by the latch 42. The comb-shaped member 50 straddles the sprocket wheels 51 and 52, holding the tape 160 engaged for lateral movement over and past the sensing station 47. As the lid 41 is closed upon the tape 160, the switch arm 55 (FIG. 1) is flexed upwardly by the surface of the tape 160 and thus stores energy urging its contact point 56 downwardly.

When the carriage of the accounting machine is moved to a predetermined columnar position and perforations, such as the perforation 164, are present at a corresponding position or in a corresponding column on the tape 160, the mechanical energy previously stored in the switch arm 55 drives its contact point 56 through the perforation 164 and onto the surface of the contact point 61 (FIG. 6). The contact point 61 is in a circuit which includes the terminal 63. The terminal 63 is connected by a lead 172 to a relay (not shown) in a power circuit 173 in the accounting machine. The engagement of the contact point 56 with the contact point 61 causes operation of the relay in the power circuit 173. The power circuit 173 at this time operates to energize the solenoid 129. Switch arms, similar to the switch arm 55, are also provided to operate in conjunction with the contact points 62 and 57 if perforations, such as the perforations 165 and 166, are present in the selected column of the tape 160. For instance, when the contact point 62 is engaged by the contact point of its associated switch arm, a circuit is completed by way of the terminal 64 and the lead 174 to a control circuit 175 in the accounting machine. The control circuit 175 then functions to cause a product previously calculated by the accounting machine to be transferred from the product switches thereof to the differential actuators thereof for print-out or other purposes, as set forth in the Thomas et al. application, previously referred to.

Upon energization of the solenoid 129, the operating arm 100 is caused to rotate counter-clockwise, pulling the link 99, to which is attached the control slide 89, to the left (FIG. 8). The operating lever 127 is also rotated, thus being caused to effect movement of the reset links 114 and 114a to accomplish the resetting of the sensing device in a manner explained in more particularity hereinafter.

As the control slide 89 moves to the left (FIG. 8), the four apertures or cam slots therein, such as the apertures 97 and 98, act to positively move the shafts 106 and 109 upwardly in the vertical apertures in the front and rear support plates 82 and 83. As the shafts 106 and 109 are carried upwardly, the insulating members 134 and 134a of the sensing arms 105 and 108 come into contact with the contact elements 135 and 135a with enough force to overcome the friction and inertia of these sensing arms and their associated sensing members 110 and 111. As the shafts 106 and 109 continue their upward movement, the force transmitted from the contact elements 135, for example, through the insulating member 134 operates to bias the end 132 of the sensing arm 105 towards a first position, whereby the end 132 of the sensing arm 105 engages the bottom surface of a slot in the guide block 116. Accordingly, the sensing arm 105 is caused to rotate about the shaft 106 and thus transmit upward movement to the sensing member 110. As a result, the sensing member 110 moves into association with a perforation-receiving area of the tape 160.

To point out the action of the sensing device during a cycle when a perforation 169 has been sensed in the tape 160, the movement of the elements to the left of the reading station 47 in FIG. 2 is now described.

If a perforation 169 is present in the tape 160, the sensing member 110 is carried to its maximum vertical position, determined by the guide block 116, and the sensing member 110 extends partially through the tape 160. Then, when the control slide 89 returns to a position shown in FIG. 2, the shaft 106 and the sensing arm 105 return to their original positions, with the end 132 of the sensing arm 105 remaining also in its first position. The contact elements 135 associated with the sensing arm 105 continue to rest against the contact point 141 of the contact element 142. Accordingly, an electrical circuit, completed through the contact elements 135 and the contact element 142, indicates that the end 132 of the sensing arm 105 is in its first position, which, in turn, signifies that a perforation 169 has been sensed in the tape 160.

To point out the action of the sensing device during a cycle when the lack of a perforation 169 has been sensed in the tape 160, the movement of the elements to the right of the reading station 47 in FIG. 2 is now described.

If a perforation 169 is lacking in the tape 160, the sensing member 111 is restricted from further upward movement by the tape 160. As the shaft 109 is carried to its maximum upward movement, the sensing arm 107 is rotated, so that the insulating member 134a is driven upward, carrying with it the contact elements 135a, which are now lifted away from the contact point 141a of the contact elements 142a and into contact with the contact point 149a of the contact element 148a. The reset slides 117a, one for each of the sensing arms 107 and sensing members 111, are slidably mounted in the guide block 116a. These reset slides 117a are urged against the points 133 of the sensing arms 107 by the energy stored in the spring 122a. The reset slides 117a, normally positioned as the slides 117, have a stepped surface 131a, which moves to the left (FIG. 2) under the urging of the spring 122a into the position shown in FIG. 2 when the end 133 of the sensing arm 107 is carried above the vertical level of the stepped surface 131a. As the control slide 89 returns to the position shown in FIG. 2, the shaft 109 returns downwardly to its original position. Since the stepped surface 131a of the reset slide 117a now restricts the movement of the sensing arm 107 by engaging its end 133, the sensing arm 107 and the sensing member 111 are forced into the position shown in FIG. 2, where the end 133 of the sensing arm 107 is held in a second position. The effect of the foregoing is to retain the contact elements 135a against the contact point 149a of the contact element 148a after conclusion of the cycle of the sensing device. Accordingly, an electrical circuit completed through the contact elements 135a and the contact element 148a indicates that the end 133 of the sensing arm 107 is in its second position, which, in turn, signifies that the lack of a perforation 169 has been sensed in the tape 160.

At the commencement of every sensing operation, a reset operation is performed, so that the ends 132 and 133 of all of the sensing arms 105 and 107 are located in their first position, in engagement with the lower surface of the slots in the guide blocks 116 and 116a. Upon movement of the operating arm 100 in response to energization of the solenoid 129, the operating lever 127 moves the reset link 114 forward. The cam projections 120 of the reset link 114 move the reset plate 115 to the left, against the action of the spring 119. This movement of the reset plate 115 causes the reset slides 117 to be moved to the left also, against the action of the springs 122. As the slides 117 are moved to the left, the ends 132 of any of the sensing arms 105 which may have previously rested on the stepped surface 131 of a slide 117 are moved downwardly, towards their first position, by means of the biasing action of the contact elements 135. Then, the operating lever 127 is rotated counter-clockwise by means of the stud 155 away from engagement with the camming surface 156 of the reset link 114. The reset link 114 is then allowed to move back to its original position under the urging of the spring 119, and the reset slides 117 move back to the right and engage the ends 132 of the sensing arms 105. When the reset link 114 is moved forward, the link 125 is rotated about the stud 126 in a clockwise direction. This movemnet of the link 125 causes the reset link 114a to be moved rearwardly to insure that all of the sensing arms 107 are reset in the same manner in which the reset link 114 accomplishes the reset operation for the sensing arms 105.

With the reset operation having been accomplished, the sensing arms 105 and 108 are now operated as heretofore described to sense the information present in the tape 160.

From the preceding description, it is seen that an electrical voltage applied through the current conductors 138 of the switch element 137 is transmitted through the contact elements 135 to the contact elements 142 whenever the sensing device has sensed a perforation in the tape 160. Conversely, it is seen that an electrical voltage applied through the current conductors 138 of the switch element 137 is transmitted through the contact elements 135 to the contact elements 148 whenever the sensing device has sensed the lack of a perforation in the tape 160. It is also seen that the foregoing conditions of electrical circuitry prevail after the sensing device's cycle has been completed. The two-state mechanical information offered by the tape 160 has been sensed and is available immediately through the electrical voltage switching procedure described. It has also been retained within the sensing device for later electrical scanning when desired.

While the present invention has been described with reference to the particular embodiments thereof, it will be understood that numerous modifications may be made by those skilled in the art without actually departing from the scope of the invention. For example, the control medium may take the form of a programmable carrier or housing having a plurality of pins, studs, abutments, or other interposers discriminately placed at various stations or locations thereon, or paper, plastic, or metal cards or tapes having apertures punched therein. Therefore, the appended claims are intended to cover all such variations within the true spirit and scope of the invention.

What is claimed is:

1. Program control apparatus for an automatic machine, such as an accounting machine, comprising:
    movable means on said machine,
    a function control medium on which function control data is recorded by indicia in any of a plurality of function control data-representing positions in a plurality of areas,
    a sensing station,
    means for moving said function control medium in synchronism with said movable means to cause at least a selected one of said areas of function control data-representing positions to be moved to said sensing station,
    first sensing means to sense at least one of said function control data-representing positions in said selected area for the occurrence of an indicium condition,
    second sensing means,
    and means controlled by said first sensing means upon sensing the occurrence of said indicium condition in said one function-control-data-representing position to cause said second sensing means to then sense other of the function-control-data-representing positions in said selected area for the occurrence of an indicium condition in each.

2. Function control apparatus for an automatic machine, such as an accounting machine, comprising:
    a traveling carriage on said machine movable to various columnar positions,
    a function control tape on which function control data is recorded by perforations in any of a plurality of function-control-data-representing positions in a plurality of areas,
    a sensing station,
    means for moving said function control tape in synchronism with said traveling carriage to cause at least a selected one of said areas of function-control-data-representing positions to be moved to said sensing station,
    first sensing means to sense at least one of said function-control-data-representing positions in said selected area for the occurrence of an indicium condition,
    second sensing means,
    and means controlled by said first sensing means upon sensing a perforation in said one function-control-data-representing position of said selected area to cause said second sensing means to then sense other of the function-control-data-representing positions in said selected area for a perforation in each.

3. Function control apparatus for an automatic machine, such as an accounting machine, comprising:
    movable means on said machine,
    a function control medium on which function control data is recorded by indicia in any of a plurality of function-control-data-representing positions in a plurality of areas,
    a sensing station,
    means for moving said function control medium in synchronism with said movable means to cause at least a selected one of said areas of function-control-data-representing positions to be moved to said sensing station, first sensing means to sense at least one of said function-control-data-representing positions in said selected area for the occurrence of an indicium condition, second sensing means, comprising:
- a plurality of sensing arms equal to the number of function-control-data-representing positions in each area of said medium desired to be sensed by said second sensing means,
- a sensing member connected to each of said sensing arms,
- movable means for suppoting said sensing arms, with a portion of each of said sensing arms normally located in a first position,
- means operable to move said supporting means for said sensing arms,
- and means for biasing said portion of each of said sensing arms towards said first position at least during movement of said supporting means, whereby each of said sensing members is caused to move into association with a related function-control-data-representing position in said selected area of said medium,
  - whereupon if a sensing member senses said indicium condition in said related function-control-data-representing position, said portion of said sensing arm will remain in said first position,
  - said biasing means forming a part of a circuit provided for each of said sensing arms when said portion of said sensing arm is in said first position, and means controlled by said first sensing means upon sensing the occurrence of said indicium condition in said one function-control-data-representing position of said selected area to cause operation of said means operable to move said supporting means.

4. Function control apparatus for an automatic machine, such as an accounting machine, comprising:

movable means on said machine, a function control medium on which function control data is recorded by indicia in any of a plurality of function-control-data-representing positions in a plurality of areas, a sensing station, means for moving said function control medium in synchronism with said movable means to cause at least a selected one of said areas of function-control-data-representing positions to be moved to said sensing station, first sensing means to sense at least one of said function-control-data-representing positions in said selected area for the occurrence of an indicium condition, second sensing means, comprising:
- a shaft,
- shift means operable to shift said shaft,
- a plurality of lever means equal to the number of function-control-data-representing positions in each area of said medium desired to be sensed by said second sensing means, each of said lever means being rotatably supported on said shaft and having a portion normally located in a first position,
- a sensing member connected to each of said lever means,
- and means for biasing said portion of each of said lever means towards said first position at least during shifting of said shaft, whereby each of said sensing members is caused to move into association with a related function-control-data-representing position in said selected field of said medium,
  - whereupon if a sensing member senses an indicium condition in said related function-control-data-representing position, said portion of said lever means will remain in said first position,
  - said biasing means forming a part of a circuit provided for each of said lever means when said portion of said lever means is in said first position.

and means controlled by said first sensing means upon sensing the occurrence of said indicium condition in said one function-control-data-representing position of said selected area to cause said shift means to be operated.

5. Function control apparatus for an automatic machine, such as an accounting machine, comprising:

movable means on said machine, a function control medium on which function control data is recorded by indicia in any of a plurality of function-control-data-representing positions in a plurality of areas, a sensing station.

means for moving said function control medium in synchronism with said movable means to cause at least a selected one of said areas of function-control-data-representing positions to be moved to said sensing station, first sensing means to sense at least one of said function-control-data-representing positions in said selected area for the occurrence of an indicium condition, a second sensing means, comprising:
- a shaft,
- shift means operable to shift said shaft,
- a plurality of lever means equal to the number of function control-data-representing positions in each area of said medium desired to be sensed by said second sensing means, each of said lever means being rotatably supported on said shaft and having a portion normally located in a first position,
- a sensing member connected to each of said lever means,
- means for biasing said portion of said lever means towards said first position at least during shifting of said shaft, whereby each of said sensing members is caused to move into association with a related function-control-data-representing position in said selected area of said medium,
  - whereupon if a sensing member senses an indicium condition in said related function-control-data-representing position, said portion of said lever means will move out of said first position to a second position,
- and holding means for each of said lever means operable after movement of said portion of said lever means out of said first position to hold said portion of said lever means in said second position,
  - said biasing means forming a part of one or another circuit of a pair of circuits provided for each of said lever means, depending upon whether said portion of said lever means is in said first position or said second position, and means controlled by said first sensing means upon sensing the occurrence of said indicium condition in said one function-control-data-representing position of said selected area to cause said shift means to be operated.

6. A device for sensing a medium for the occurrence of one or another indicium condition and capable of retaining the sensed information until the next sense operation, comprising, in combination, a shaft, means for shifting said shaft, lever means rotatably supported on said shaft and having a portion normally located in a first position,
a sensing member connected to said lever means,
stationary means having at least one slot therein accommodating said portion of said lever means for preventing movement of said portion of said lever means from said first position except in a single direction,
means for biasing said portion of said lever means towards said first position at least during shifting of said shaft, whereby said sensing member is caused to move into association with an indicium-receiving area of said medium,
    whereupon if said sensing member senses one indicium condition in said area, said biasing means will maintain said portion of said lever means in substantially said first position,
    and, if said sensing member senses the lack of an indicium condition in said area, said portion of said lever means will move out of said first position to a second position against the action of said biasing means,
holding means movable in said slot of said stationary means having a raised surface engageable with said portion of said lever means after movement of said portion of said lever means out of said first position to hold said portion of said lever means in said second position,
and means to electrically determine whether said portion of said lever means is in either said first position or said second position.

7. A device for sensing a medium for the occurrence of one or another indicium condition and capable of retaining the sensed information until the next sense operation, comprising, in combination,
a shaft,
means for shifting said shaft,
lever means rotatably supported on said shaft and having a portion normally located in a first position,
a sensing member connected to said lever means,
stationary means having at least one slot therein accommodating said portion of said lever means for preventing movement of said portion of said lever means from said first position except in a single direction,
means for biasing said portion of said lever means towards said first position at least during shifting of said shaft, whereby said sensing member is caused to move into association with an indicium-receiving area of said medium,
    whereupon if said sensing member senses one indicium condition in said area, said biasing means will maintain said portion of said lever means substantally in said first position,
    and, if said sensing member senses the lack of an indicium condition in said area, said portion of said lever means will move out of said first position to a second position against the action of said biasing means,
holding means movable in said slot of said stationary means having a raised surface engageable with said portion of said lever means after movement of said portion of said lever means out of said first position to hold said portion of said lever means in said second position,
means to electrically determine whether said portion of said lever means is in either said first position or said second position,
and means for rendering said holding means inoperative to allow said portion of said lever means to return to said first position prior to the next sense operation.

8. A device for closing a normally open circuit contact in response to the sensing of a particular indicium condition in a medium, comprising, in combination:
a shaft,
means for shifting said shaft,
lever means rotatably supported on said shaft,
a sensing member connected to said lever means,
a pair of circuit contacts,
actuable electrically-conductive means normally closing one of said circuit contacts and biasing said lever means at least during shifting of said shaft whereby said sensing member is caused to move into association with an indicium-receiving area of said medium,
    said conductive means remaining operative to close said one circuit contact if said sensing member senses the lack of said particular indicium condition in said area,
and holding means operable if said sensing member senses the presence of said particular indicium condition in said area to cause said lever means to actuate said conductive means, whereby said one circuit contact is opened and the other normally open circuit contact is closed by said conductive means.

9. A device for sensing a medium for the occurrence of an indicium condition and capable of retaining the sensed information until the next sense operation, comprising, in combination,
stationary means having a pair of apertures therein,
a movable slide positioned between the apertures in said stationary means having an aperture associated with each of the apertures in said stationary means,
a shaft extending through the apertures in said stationary means and said movable slide,
lever means rotatably supported on said shaft and having a portion normally located in a first position,
a sensing member connected to said lever means,
means to move said slide to cause said shaft to be shifted within the apertures in said stationary means,
means for biasing said portion of said lever means towards said first position at least during shifting of said shaft, whereby said sensing member is caused to move into association with an indicium-receiving area of said medium,
    whereupon if said sensing member senses said indicium condition in said area, said biasing means will maintain said portion of said lever means substantially in said first position,
    and, if said sensing member senses the lack of said indicium condition in said area, said portion of said lever means will move out of said first position to a second position against the action of said biasing means,
holding means operable after movement of said portion of said lever means out of said first position to hold said portion of said lever means in said second position,
and means to electrically determine whether said portion of said lever means is in said first position or said second position.

10. A device for sensing a medium for the occurrence of one or another indicium condition and capable of retaining the sensed information until the next sense operation, comprising, in combination,
stationary means having a pair of apertures therein,
a movable slide positioned between the apertures in said stationary means and having an aperture associated with each of the apertures in said stationary means,
a shaft extending through the apertures in said stationary means and said movable slide,
lever means rotatably supported on said shaft and having a portion normally located in a first position,
a sensing member connected to said lever means,
means to move said slide to cause said shaft to be shifted within the apertures in said stationary means, means for biasing said portion of said lever means towards said first position at least during shifting of said shaft, whereby said sensing member is caused to move into association with an indicium-receiving area of said medium, whereupon if said sensing member senses one indicium condition in said area, said biasing means will maintain said portion of said lever means substantially in said first portion, and, if said sensing member senses another indicium condition in said area, said portion of said lever means will move out of said first position to a second position against the action of said biasing means, means for rendering said holding means inoperative to allow said portion of said lever means to return to said first position prior to the next sense operation, and means to electrically determine whether said portion of said lever means is in either said first position or said second position.

11. A device for sensing a medium for the occurrence of an indicium condition in indicium-receiving positions arranged in areas on said medium and capable of retaining the sensed information until the next sense operation, comprising, in combination:

a shaft, means for shifting said shaft, a plurality of lever means, equal to the number of indicium-receiving positions in each area of said medium desired to be sensed, each of said lever means being rotatably supported on said shaft and having a portion normally located in a first position, a sensing member connected to each of said lever means, means for biasing said portion of each of said lever means towards said first position at least during shifting of said shaft, whereby each of said sensing members is caused to move into association with a related indicium-receiving position in a selected area of said medium, whereupon if a sensing member senses said indicium condition in said related position, said portion of the lever means associated with said related position will move out of said first position to a second position against the action of said biasing means, holding means for each of said lever means operable after movement of said portion of said lever means out of said first position to hold said portion of said lever means in said second position, and means to electrically determine whether said portion of each of said lever means is in said first position or said second position.

12. A device for sensing a medium for the occurrence of one or another indicium condition in indicium-receiving positions arranged in areas on said medium and capable of retaining the sensed information until the next sense operation, comprising, in combination:

a shaft, means for shifting said shaft, a plurality of lever means, equal to the number of indicium-receiving positions in each area on said medium desired to be sensed, each of said lever means being rotatably supported on said shaft and having a portion normally located in a first position, a sensing member connected to each of said lever means, means for biasing said portion of each of said lever means towards said first position at least during shifting of said shaft, whereby each of said sensing members is caused to move into association with a related indicium-receiving position in a selected area of said medium, whereupon if a sensing member senses one indicium condition in said related position, said biasing means will maintain said portion of the lever means associated with said related area substantially in said first position, and, if said sensing member senses another indicium condition in said related position, said portion of the lever means associated with said related position will move out of said first position to said second position against the action of said biasing means, holding means for each of said lever means operable after movement of said portion of said lever means out of said first position to hold said portion of said lever means in said second position, and means to electrically determine whether said portion of each of said lever means is in either said first position or said second position.

13. A device for closing a normally open circuit contact in response to the sensing of a particular indicium condition in a medium, comprising, in combination:

a shaft, means for shifting said shaft, lever means rotatably supported on said shaft, a sensing member connected to said lever means, a pair of circuit contacts, actuable electrically-conductive means normally closing one of said circuit contacts and biasing said lever means at least during shifting of said shaft, whereby said sensing member is caused to move into association with an indicium-receiving area of said medium, said conductive means remaining operative to close said one circuit contact if said sensing member senses the lack of said particular indicium condition in said area, holding means operable if said sensing member senses the presence of said particular indicium condition in said area to cause said lever means to actuate said conductive means whereby said one circuit contact is opened and the other normally open circuit contact is closed by said conductive means, and means for rendering said holding means inoperative prior to the next sense operation whereby said one circuit contact is allowed to be closed again by said conductive means and the other normally open circuit contact is opened.

14. A device for closing a normally open circuit contact in response to the sensing of a particular indicium condition in a medium, comprising, in combination:

a shaft, means for shifting said shaft, lever means rotatably supported on said shaft, a sensing member connected to said lever means, a normally open circuit contact, actuable electrically-conductive means operable when actuated to close said circuit contact and biasing said lever means at least during shifting of said shaft, whereby said sensing member is caused to move into association with an indicium-receiving area of said medium, said conductive means remaining unactuated if said sensing member senses the lack of said particular indicium condition in said area, and holding means operable if said sensing member senses the presence of said particular indicium condition in said area to cause said lever means to actuate said conductive means, whereby said circuit contact is closed by said conductive means.

15. In an accounting or similar calculating machine, the combination of:

a traveling record material carriage movable to any one of a plurality of predetermined columnar positions, a function control medium having function representing indicia in a plurality of areas each corresponding to a columnar position of said record material carriage, means for moving said function control medium in synchronism with the columnar movements of said record material carriage so that thereby a corresponding function representing indicia area is presented to a sensing station when said record material carriage is moved to any particular columnar position, a first sensing device which senses function representing indicia in a first position of any effective area of said function control medium, a second sensing device, and an actuating device for said second sensing device rendered effective, when said first sensing device senses the presence of function representing indicia in said first function representing indicia position, to actuate said second sensing device so as to cause the latter to sense function representing indicia in at least one further function representing indicia position in the effective field of said function control medium.

References Cited by the Examiner
UNITED STATES PATENTS 2,577,070  12/51  Cheney _____ 235—61.11
3,051,381  8/62   Drillick _____ 235—61.11

MALCOLM A. MORRISON, *Primary Examiner.*

DARYL W. COOK, *Examiner.*